March 30, 1954 C. C. POWELL Re. 23,809

AUTOMATIC EGG CLEARING MACHINE

Original Filed Aug. 30, 1949 2 Sheets-Sheet 1

INVENTOR.
CLYDE C. POWELL
BY
Reynolds & Beach
ATTORNEYS

March 30, 1954 C. C. POWELL Re. 23,809

AUTOMATIC EGG CLEARING MACHINE

Original Filed Aug. 30, 1949 2 Sheets-Sheet 2

INVENTOR.
CLYDE C. POWELL
BY Reynolds & Beach
ATTORNEYS

Reissued Mar. 30, 1954 Re. 23,809

UNITED STATES PATENT OFFICE 23,809

AUTOMATIC EGG CLEANING MACHINE

Clyde C. Powell, Bellevue, Wash., assignor to National Poultry Equipment Company, Seattle, Wash., a partnership Original No. 2,554,878, dated May 29, 1951, Serial No. 113,196, August 30, 1949. Application for reissue May 26, 1953, Serial No. 357,652

18 Claims. (Cl. 51—23)

Matter enclosed in heavy brackets [ ] appears in the original patent but forms no part of this reissue specification; matter printed in italics indicates the additions made by reissue.

The cleaning of eggs without wetting them, and by abrasion, has long been accomplished by mechanism such as is shown in the two patents to Miller et al., Nos. 1,964,295 of June 26, 1934, and 2,018,967 of October 29, 1935. In each such machine a generally cylindrical assemblage supporting a multiplicity of light abrasive loops rotates rapidly to urge the loops centrifugally outwardly and to drag the loops over the surface of an egg held at a fixed station for a period of time determined by the operator, and in so doing not only effects removal of dirt from one particular area of the eggshell, but also, by the dragging action of the loops, effects rotation of the egg end for end and around its major or polar axis in such manner as to present all its surface eventually to the abrasive action of the loops. In order to accomplish this end, fixity of the location of the egg at one particular station, and a particular attitude at that station, are necessary.

Such machines, while long successfully used by poultrymen in appreciable numbers, nevertheless required constant attention on the part of an operator, and notwithstanding that they might be made of a capacity to work simultaneously on twelve or fifteen eggs, nevertheless required a quite appreciable period of time to clean the large numbers of dirty eggs produced, despite the best of precautions, at any large-scale poultry farm. Moreover, the completeness and effectiveness of the cleaning operation was dependent in considerable measure upon the judgment and attentiveness of the operator, and was not always uniform.

According to the present invention similar abrasive means are employed, for they have proven highly successful, and destructive in the very minimum degree to the eggs, yet the operation is made automatic throughout, and requires no attention whatsoever on the part of the operator or operators other than to place individual eggs into the machine one by one, and to remove the cleaned eggs, briefly inspect them, and dispose of them.

More specifically, according to the present invention, individual eggs are advanced slowly, *and preferably at a constant rate and by positive advancing means,* along a track or path, which is normally a straight path, and as they advance along this track or path they are acted upon by *the many individually yieldable abrasive elements of the two* [the] rotative abrasive means, *each* [and their many component abrasive elements,] placed *fixedly* alongside each side of the path, and as [they] *the eggs* advance, but without dependence upon the abrasive drag, [the eggs] *they* are automatically rolled about their major axis, which was initially directed and automatically remains oriented transversely of the direction of advance, and [so] *thus* each polar cap or zone is *swiped, and so* abraded and cleaned. Since each such abrasive cylinder is of appreciable length, it is preferred that they be placed *generally* side by side, and operate simultaneously upon the passing eggs. However, *since the two cylindrical loci may not meet nor intersect, in order* to insure that there is not left an equatorial zone which is uncleaned, *each egg is tilted so that first one end and then the other is uptilted towards the rotative axes of the respective abrasive elements. One way of doing this is to rock* the track and the eggs carried by it [are rocked] repeatedly from side to side, and *by such means or any equivalent expedient* [thus] each polar cap or zone of abrasion extends *in turn* past the equator of the egg, to provide an equatorial zone of overlapping abrasion and cleaning, *and each polar area in turn is swiped,* thereby insuring completeness of the cleaning of each egg.

The provision of mechanism for and a method [to] thus *to* clean eggs is the primary object of this invention.

It is likewise an object to provide mechanism of the general nature indicated, which shall be simple, relatively inexpensive, and rugged and reliable for use over long periods of time, and under the conditions normally encountered in the cleaning and handling of eggs.

Detailed objects, and particularly such as relate to the construction and arrangement of the individual parts, and of the drive means and the like, will all be ascertainable as this specification progresses.

In the accompanying drawings the invention is shown embodied in a mechanical form, such as is presently preferred by me.

The abrasive means used are, or may be, substantially the same as those shown in the Miller *et al.* patents referred to above, and therefore need no detailed description. Briefly they are rotative cylindrical devices, each one including an axial shaft 10, structural supports 11 thereon which provide points of support, angularly and axially spaced at short intervals, for abrasive loops, generally made of sandpaper, indicated at 1. There are a great multiplicity of such loops in each individual abrasive cylinder, and two such cylinders are employed, rotative oppositely, alongside one another and generally in parallelism, and sufficiently closely spaced that their centrifugally outflung loops 1 nearly—but preferably not quite—engage one another at their line of closest approach, midway between their shafts 10.

Figure 3:
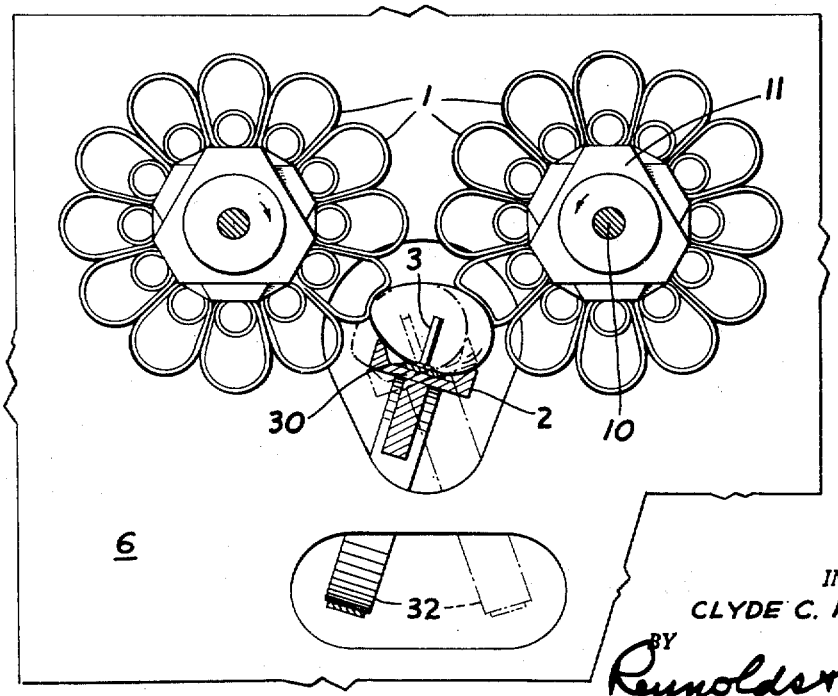
Figure 3 is a general cross-sectional view, on an enlarged scale, through the track, the conveyor means, and the abrasive means.

Intermediate these rotative abrasive cylinders is supported a track 2 of some considerable length, sufficient to extend alongside of and beyond each end of the abrasive cylinders. Preferably this is trough-like in form, to leave upstanding ridges along each side for rolling support of an egg (see Figure 3), and to leave within the bottom of the trough space for a conveyor means such as the endless belt 30, which in turn carries rubber-covered pins 3, which are spaced apart just sufficiently to receive the minor or equatorial diameter of an egg, and by the advance of these pins to advance an egg so engaged along the track. The egg automatically orients itself so as to roll on equal diameters at its two ends, and does not wobble. The conveyor belt 30 is received upon pulleys 31 and 32 journaled in the track 2 or in extensions integral with the track. Low-speed drive means, as indicated generally at 33, also carried by the track, advance the belt and its eggs slowly along the track.

The track is so located with respect to the two abrasive cylinders, and the orbits *or cylindrical loci* of their loops 1, that each egg, as it rolls along the track, will be engaged by the successive loops as the cylinders whirl rapidly, and each loop, being flexible, will yield, conform to the surface contour of, and drag over each egg. By the combination of this dragging action toward each pole of the egg, and the rolling of the egg about its polar axis, abrasion of each polar area is, which heretofore has been particularly difficult of attainment, assured. It will be noted from Figure 3 that the dragging action tends to hold the egg down upon the track 2, rather than the converse.

However, it is not practicable to locate the egg's path closely enough to the line of closest approach of the two abrasive cylinders to insure that the equatorial zone of each egg will be abraded, and indeed it would require mutual contact of the abrasive loops on the two different cylinders, which is undesirable, in order to insure this. Likewise cleansing of the polar caps may not be thorough unless the egg's axis be brought more nearly tangent to the orbit of the abrading loops. Accordingly, in order that these ends can be assured, yet without heavy striking or abrasion of the egg by any loops, the track 2 is mounted *to tilt the egg and to reverse its tilt at least once, or oftener, as by* [for] rocking back and forth sidewise, while the egg progresses therealong. For this purpose it is mounted at each of its ends upon an arcuate supporting member 21, and this is carried upon rollers 22 fixed in the supporting frame. By such means the entire track, and everything carried thereby or thereon, including the conveyor drive means 33, can be rocked back and forth about an axis which is offset in the vertical direction from the locus of the eggs' centers, as by being located somewhat below the center of the egg, whereby each egg's polar cap is abraded throughout an appreciable zone surrounding the pole, and its equatorial zone is presented first to one abrasive means, then to the other, and so on, reversing repeatedly, to the end that, in conjunction with the rolling of the egg, all portions of the polar zones and the equatorial zone are abraded thoroughly. In a sense, the two polar zones overlap in this equatorial zone.

Figure 2:
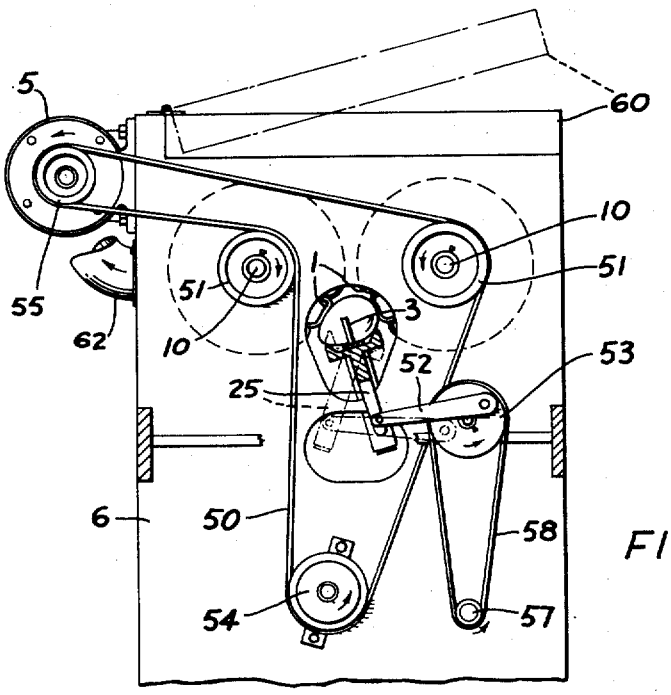
Figure 2 is a general end elevational view from the feed end, with the track and conveyor means, however, shown in cross section.

The means to accomplish the rocking of the track may be any that are found convenient, and in Figure 2 the track is shown as provided with a depending arm 25, to the end of which is secured a connecting link 52 from a crank disk 53, which is rotated by any convenient drive means from the main drive motor 5, which can also effect rapid rotation of the two abrasive means.

The actual drive, as herein shown, comprises a motor drive pulley 55, pulleys 51 on the end of each shaft 10, a take-up pulley 54, and a drive belt 50 extending from the motor drive pulley 55 and about the pulleys 51 and 54. The shafts 10 being power-driven, one of them, through the belt 56, may drive a jackshaft 57, by means of which, through a belt 58, the crank disk 53 may be slowly rotated.

Figure 1:
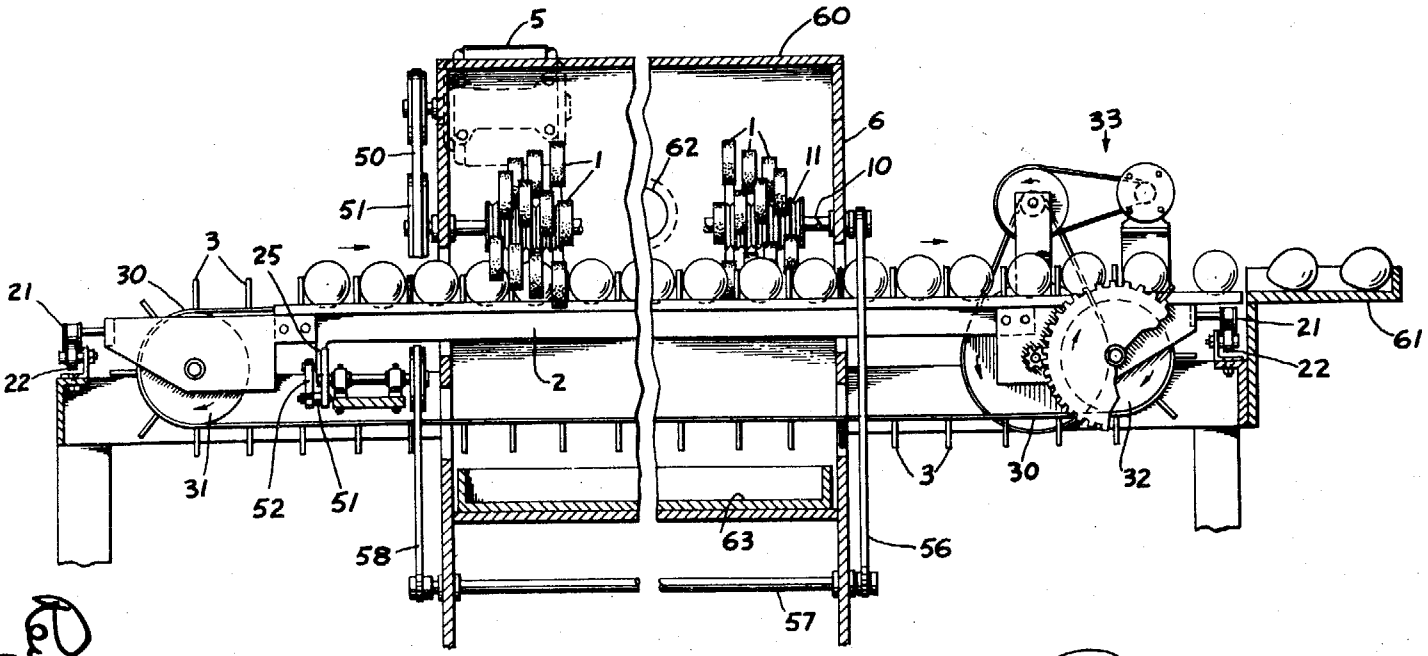
Figure 1 is in the nature of a side elevational view of the machine, with the casing and associated parts shown in section, and with certain of the operative parts broken away for better illustration.
Figure 4:
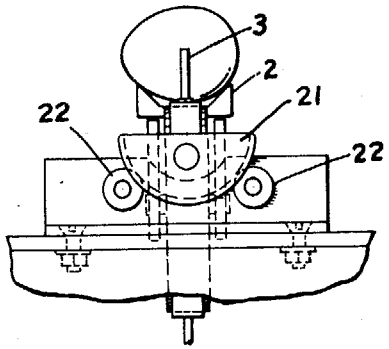
Figure 4 is an end view illustrating a detail of the mounting means for the track which permits its rocking, the viewpoint being from the feed end.

Single eggs are placed upon the feed end of the track 2, at the left as viewed in Figure 1 (wherein at the left the near abrasive means is shown, but only the farther one is shown at the right), to be advanced therealong by the pins 3. As they advance slowly along the rather appreciable length of the abrasive means, the loops 1 of the latter repeatedly drag over each egg, and the track 2 rocks slowly back and forth from side to side. The elapsed time for travel through the abrading station is considered adequate for most eggs, and yet insufficient to damage any. They emerge from the casing 6 after having been cleaned, can be briefly inspected by the operator at this end, and eventually roll upon a platform 61, where they are collected and disposed of. Frequently they are candled at this point, and if any are still dirty they may be rerun.

The casing 6 may be provided with a cover 60, which may be lifted for access to the abrasive cylinders, or to the conveyor or track in its extent within the casing. Furthermore, the use of a casing permits the employment of suction means, as is suggested by the suction outlet 62, to remove the dust and dirt which the abrasion causes. A removable tray 63 in the bottom of the casing serves to catch any eggs which are broken in the process of cleaning, which ordinarily are only those which already were checked or cracked.

It is desired to point out that the rolling of each egg as it is advancing through the abrading station is necessary in order to expose all parts of each polar zone to the abrasive action of the loops, and that their rolling should be slow, and their advance long-continued, coupled with rapid rotation of and many individual and closely following impacts from the abrasive means, in order to achieve the desired thoroughness of cleansing of these surfaces in their passage along a path of not excessive length. Nevertheless, much of the advantage of the cleansing would be lost if the equatorial zone were imperfectly cleansed, or if the polar caps were not cleaned properly, yet it is undesirable to extend the length of the egg's path in order that it may be subjected to abrasion from different points spaced about its path, hence the *tilting* [rocking] of the egg, in such coordination with its advance that its equatorial zone is repeatedly scoured during its passage through the abrading station, and from the two opposite sides, is an important factor in the success of the method.

I claim as my invention:

[1. An egg cleaning machine comprising a track along which to roll individual eggs, abrasive means disposed alongside the opposite sides of said track, movable generally in a downward direction towards the track, to engage and abrade the respective ends of the eggs as they roll along said track, and means to rock the track transversely, during the advance of the eggs, about a center offset in the vertical direction from the locus of the eggs' centers, to effect engagement of each abrasive means with each egg throughout the eggs' respective polar zones, an overlapping equatorial zone, and in each zone intermediate such polar and equatorial zones.]

[2. An egg cleaning machine as in claim 1, including means positively operable to advance the individual eggs along the track at a predetermined rate, the rocking means being arranged for operation at a rate to oscillate each egg repeatedly during its passage for repeated presentation of each polar zone to its corresponding abrasive means, and for repeated presentation of the equatorial zone alternately to each of the two abrasive means.]

[3. An egg cleaning machine as in claim 1, wherein each abrasive means comprises a cylinder rotative in general parallelism to the truck, and carrying a multiplicity of flexible abrasive elements centrifugally flung outwardly from the rotative cylinder, and self-conforming upon contact with the egg.]

4. An egg cleaning machine comprising a straight track along which to roll individual eggs, as they lie disposed transversely upon said track, means mounting the track for rocking about a longitudinal axis located somewhat below the centers of the rolling eggs, means so to rock the track from side to side, conveyor means movable lengthwise of the track and engaging each egg to advance it positively and at a controlled rate along said track, two abrasive means rotative generally in parallelism with and close alongside the respective sides of said track, and each including a multiplicity of flexible, light abrasive elements centrifugally flung outwardly into the path of the eggs, and self-conforming upon contact therewith to abrade the corresponding polar area to and including an equatorial zone common to the two polar areas, and drive means for the conveyor means and the track-rocking means, coordinated with the length of the abrasive means to assure repeated abrasion throughout the entire area of each polar zone as each egg traverses said track.

5. An egg cleaning machine as in claim 4, wherein the track-rocking drive means is separate from the conveyor drive means, and wherein the latter drive means is mounted upon and rocks with the track.

6. An egg cleaning machine as in claim 4, wherein the track-rocking drive means is separate from the conveyor drive means, and wherein the latter drive means is mounted upon and rocks with the track, and characterized further in that the track-rocking drive means is also operatively connected to rotate the abrasive means.

7. A method of cleaning an egg which comprises rolling the egg *about its major axis* along a definite path, subjecting it as it rolls to abrasive action in each of two polar areas at opposite sides of such path, and rocking the egg transversely of such path as it rolls, to extend the abrasive action into an equatorial zone wherein the two polar zones overlap.

8. A method as in claim 7, characterized in that the abrasive action is continuous throughout a substantial length of the egg's path, and in that the rocking occurs repeatedly back and forth, while the abrasive action continues and the egg continues to roll, to repeatedly expose all of both polar areas to abrasion.

9. A method as in claim 7, characterized in that the abrasive action includes a multiplicity of individual engagements of the egg with light, flexible abrasive elements, rotating about an axis generally parallel to the egg's path, and self-conforming to the egg's surface as it passes polarwise thereover.

*10. A method of cleaning an egg which comprises rolling the egg about its major axis along a definite, generally straight path, subjecting it to the action of yieldable abrasive elements rotatable in two fixed, generally cylindrical, and non-coincident loci located at the respectively opposite sides of such path to intercept the egg's locus and to swipe its surface in a direction longitudinally of the egg, and tilting the egg as it rolls, from a position wherein its major axis is inclined towards the rotative axis of a first abrasive element, and the polar area at that end is swiped by that abrasive element and the equatorial area is swiped by the opposite abrasive element, to an oppositely tilted position wherein the opposite polar area is swiped by the opposite abrasive element and the equatorial area is swiped by the first-mentioned abrasive element.*

*11. A method of cleaning an egg which comprises rolling the egg about its major axis only along a definite path; tilting the egg during its advance from a position wherein its major axis is tilted downwardly towards one side of its path to a position wherein such axis is tilted reversely; and subjecting the egg's upper surface, as it rolls and tilts, to abrasive action directed generally longitudinally of the egg.*

*12. A method of cleaning an egg which comprises rolling the egg about its major axis along a definite path at a predetermined rate of advance; tilting the egg during its advance from a position wherein its major axis is tilted downwardly towards one side of its path to a position wherein such axis is tilted reversely; and subjecting the egg's upper surface, as it rolls and tilts, to abrasive action directed generally from its equatorial zone towards its two polar zones.*

*13. A method of cleaning an egg, as defined in claim 12, characterized in that the abrasive action on the two polar zones occurs simultaneously, and the abrasive action on the downtilted end begins beyond the egg's equator, and that on the uptilted end begins at the near side of its equator, the same holding true, but at the opposite end of the egg, when the egg is reversely tilted.*

*14. A method of cleaning an egg, as defined in claim 13, characterized in that the egg is repeatedly tilted back and forth, as it advances, to*

*subject an equatorial zone alternately to repeated abrasive action towards the opposite poles.*

*15. A method of cleaning an egg which comprises rolling the egg about its major axis along a definite path at a predetermined rate of advance, subjecting its upper surface, as it rolls, to abrasive action independently of its advancement, and tilting the egg during its advance from a position wherein its major axis is tilted downwardly towards one side of its path to a position wherein such axis is tilted reversely.*

*16. A method of cleaning an egg which comprises rolling the egg about its major axis along a definite path at a predetermined rate of advance, and subjecting it as it rolls to abrasive action against its upper surface and directed generally from its equatorial zone towards both its polar zones, substantially simultaneously.*

*17. An egg cleaning machine comprising a track along which to roll individual eggs about their major axes, abrasive means disposed alongside each side of the track, and movable generally downwardly towards the rolling egg to contact the same first at spaced points in the vicinity of the momentarily uppermost portion of its equatorial zone and thence swiping outwardly towards the respective poles, and means to tilt each egg, as it rolls, from a position wherein its one pole is uptilted for swiping by the abrading means at this side of its path, and for swiping by the opposite abrading means past the equator, to a position wherein its opposite pole is uptilted for swiping by the last-mentioned abrasive means, and for swiping by the first-mentioned abrasive means past the equator.*

*18. An egg cleaning machine as in claim 17, including means separate from the abrasive means, engageable with the individual eggs to advance them along the track at a predetermined constant rate of advance.*

*19. An egg cleaning machine as in claim 17, wherein the egg-tilting means is arranged for operation at a rate to oscillate each egg repeatedly during its passage for repeated presentation of alternately more or less of each polar zone to that abrasive means which is disposed alongside the corresponding side of the track, and for repeated presentation of the equatorial zone alternately to each of the two abrasive means.*

*20. An egg cleaning machine as in claim 17, wherein each abrasive means comprises a cylinder rotative about an axis disposed in general parallelism to the track, and carrying a multiplicity of flexible abrasive elements centrifugally flung outwardly from the rotative cylinder, and self-conforming upon contact with the egg.*

*21. A method of cleaning an egg which comprises rolling the egg about its major axis along a definite, generally straight path, subjecting it to the simultaneous action of yieldable abrasive elements rotatable in two fixed, generally cylindrical and non-coincident loci located at the respectively opposite sides of such path to intercept the egg's locus and to swipe its surface in a direction longitudinally of the egg and transversely of its path, the egg's attitude with relation to the two abrasive elements at one end of its path presenting one polar cap to a first such element and its opposite polar cap and equatorial zone to the second such element, and reversing its attitude as it advances along such path to present its opposite polar cap and equatorial zone to the second such element and its first polar cap to the first such element.*

CLYDE C. POWELL.

References Cited in the file of this patent or the original patent

UNITED STATES PATENTS

| Number | Name | Date |
|---|---|---|
| 324,641 | Berry | Aug. 18, 1885 |
| 1,461,134 | Maull | July 10, 1923 |
| 1,776,784 | Cramer | Sept. 30, 1930 |
| 1,862,671 | Field | June 14, 1932 |
| 1,876,688 | Kasser | Sept. 13, 1932 |
| 1,964,295 | Miller et al. | June 26, 1934 |
| 1,976,805 | Robinson | Oct. 16, 1934 |
| 2,018,967 | Miller et al. | Oct. 29, 1935 |
| 2,235,404 | Manggaard | Mar. 18, 1941 |
| 2,640,210 | Zauner | June 2, 1953 |